United States Patent
Talley et al.

(10) Patent No.: US 11,543,542 B2
(45) Date of Patent: Jan. 3, 2023

(54) OCCLUSION-BASED DIRECTIONALITY AND LOCALIZATION OF RADIATION SOURCES WITH MODULAR DETECTION SYSTEMS AND METHODS

(71) Applicant: FLIR Detection, inc., Stillwater, OK (US)

(72) Inventors: Kemper Talley, Oak Ridge, TN (US); Felix J. Liang, Oak Ridge, TN (US); William T. Milam, Maryville, TN (US); Leslie Hoy, Knoxville, TN (US); Kyle Hawes, Knoxville, TN (US); Hartmut Brands, Oak Ridge, TN (US); Steve W. Fleetwood, Knoxville, TN (US)

(73) Assignee: Teledyne FLIR Detection, Inc., Stillwater, OK (US)

( * ) Notice: Subject to any disclaimer, the term of this patent is extended or adjusted under 35 U.S.C. 154(b) by 0 days.

(21) Appl. No.: 17/319,005

(22) Filed: May 12, 2021

(65) Prior Publication Data

US 2021/0278552 A1    Sep. 9, 2021

Related U.S. Application Data

(63) Continuation of application No. PCT/US2019/056797, filed on Oct. 17, 2019.
(Continued)

(51) Int. Cl.
*G01T 1/208* (2006.01)
*G01T 1/20* (2006.01)

(52) U.S. Cl.
CPC ............ *G01T 1/2008* (2013.01); *G01T 1/208* (2013.01)

(58) Field of Classification Search
CPC ....... G01T 1/2907; G01T 3/00; G01T 1/2008; G01T 1/208; G01V 5/0075
See application file for complete search history.

(56) References Cited

U.S. PATENT DOCUMENTS 9,599,727 B2    3/2017   Ouspenski et al.
10,416,322 B1 *  9/2019   Newman ................. G01V 5/00
(Continued)

FOREIGN PATENT DOCUMENTS

WO    WO 2011/012155 A1    2/2011

OTHER PUBLICATIONS

Osovizky, A, et al., "SENTIRAD—An Innovative Personal Radiation Detector Based on a Scintillation Detector and a Silicon Photomultiplier", Nuclear Instruments and Methods in Physics Research A, vol. 652, Jan. 12, 2011, pp. 41-44.
(Continued)

*Primary Examiner* — David P Porta
*Assistant Examiner* — Fani Polyzos Boosalis
(74) *Attorney, Agent, or Firm* — Haynes and Boone, LLP

(57) ABSTRACT

Various techniques are provided to detect the direction and location of one or more radiation sources. In one example, a system includes a plurality of radiation detectors configured to receive radiation from a radiation source. A first one of the radiation detectors is positioned to at least partially occlude a second one of the radiation detectors to attenuate the radiation received by the second radiation detector. The system also includes a processor configured to receive detection information provided by the first and second radiation detectors in response to the radiation, and determine a direction of the radiation source using the detection information. A modular system including gamma radiation detectors and neutron radiation detectors and related methods are also provided. In some cases, radiation source type
(Continued)

may be determined in addition to or separate from radiation source direction.

20 Claims, 6 Drawing Sheets

Related U.S. Application Data

(60) Provisional application No. 62/760,146, filed on Nov. 13, 2018.

(56) References Cited

U.S. PATENT DOCUMENTS

| | | | | |
|---|---|---|---|---|
| 10,605,932 | B1 * | 3/2020 | Newman | G01V 5/0091 |
| 11,010,852 | B2 * | 5/2021 | Hansell | B64C 39/024 |
| 2005/0121618 | A1 * | 6/2005 | Fowler, Jr. | G01T 1/169 |
| | | | | 250/361 R |
| 2007/0029493 | A1 | 2/2007 | Kniss et al. | |
| 2009/0236538 | A1 | 9/2009 | Frank | |
| 2009/0294678 | A1 | 12/2009 | Frank | |

OTHER PUBLICATIONS

Ayaz-Maierhafer, B., et al., "Design Optimization fora Wearable, Gamma-Ray and Neutron Sensitive, Detector Array with Directionality Estimation", Nuclear Instruments and Methods in Physics Research, A, vol. 870, Jul. 27, 2017, pp. 131-139.

* cited by examiner

OCCLUSION-BASED DIRECTIONALITY AND LOCALIZATION OF RADIATION SOURCES WITH MODULAR DETECTION SYSTEMS AND METHODS

CROSS-REFERENCE TO RELATED APPLICATIONS

This patent application is a continuation of International Patent Application No. PCT/US2019/056797 filed Oct. 17, 2019 and entitled "OCCLUSION-BASED DIRECTIONALITY AND LOCALIZATION OF RADIATION SOURCES WITH MODULAR DETECTION SYSTEMS AND METHODS", which is hereby incorporated by reference in its entirety.

International Patent Application No. PCT/US2019/056797 claims the benefit of and priority to U.S. Provisional Patent Application No. 62/760,146 filed Nov. 13, 2018 and entitled "OCCLUSION-BASED DIRECTIONALITY AND LOCALIZATION OF RADIATION SOURCES WITH MODULAR DETECTION SYSTEMS AND METHODS," which is hereby incorporated by reference in its entirety.

TECHNICAL FIELD

The present invention relates generally to the detection of radiation sources and, more particularly, to the determination of the direction and location of such sources.

BACKGROUND

Radiation detection systems are important tools used to discover and interdict nuclear threats. As such, they are frequently used in support of homeland security, nuclear nonproliferation, and nuclear treaty verification.

Certain existing radiation detection systems are non-directional. In this regard, such systems may detect the presence of a radiation source, but may not be able to discern the actual direction and position of the radiation source. Indeed, such systems may rely on human trial and error until the human user can ascertain a detection pattern and determine the direction and location of the radiation source. Accordingly, such systems can be relatively inefficient and imprecise.

In addition, certain radiation sources may emit multiple types of radiation, for example, both gamma radiation and neutron radiation. However, detecting both types of radiation is often more difficult. For example, many existing radiation detection systems are dedicated to detecting only one type of radiation. As a result, multiple detection devices may be required which can be cumbersome for users.

Although certain lithium-doped scintillators may be used to detect both gamma radiation and neutron radiation using a single detector, such dual-mode detectors have significant limitations. For example, in order to discriminate between gamma radiation and neutron radiation, such detectors may attempt to identify different detected pulse heights and pulse shapes. However, in strong radiation fields, pulse pileup can degrade the detector's ability to accurately discriminate between gamma radiation and neutron radiation. In addition, such dual-mode detectors typically exhibit low yields during manufacture which increases costs and reduces manufacturing efficiencies.

SUMMARY

In accordance with embodiments discussed herein, techniques are provided to detect the direction and location of one or more radiation sources. By determining the locations of multiple radiation sources, a radiation map may be provided. A modular system including gamma radiation detectors and neutron radiation detectors and related methods are also provided.

In one embodiment, a system includes a plurality of radiation detectors configured to receive radiation from a radiation source, wherein a first one of the radiation detectors is positioned to at least partially occlude a second one of the radiation detectors to attenuate the radiation received by the second radiation detector; and a processor configured to: receive detection information provided by the first and second radiation detectors in response to the radiation, and determine a direction of the radiation source using the detection information.

In another embodiment, a method includes receiving radiation at a plurality of radiation detectors from a radiation source, wherein a first one of the radiation detectors is positioned to at least partially occlude a second one of the radiation detectors to attenuate the radiation received by the second radiation detector; receiving detection information provided by the first and second radiation detectors in response to the radiation; and determining a direction of the radiation source using the detection information.

In another embodiment, a system includes a plurality of radiation detectors configured to receive radiation from a radiation source, wherein a first one of the radiation detectors is positioned to at least partially occlude a second one of the radiation detectors to attenuate the radiation received by the second radiation detector; and a processor configured to: receive detection information provided by the first and second radiation detectors in response to the radiation, and identify the radiation source using the detection information.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
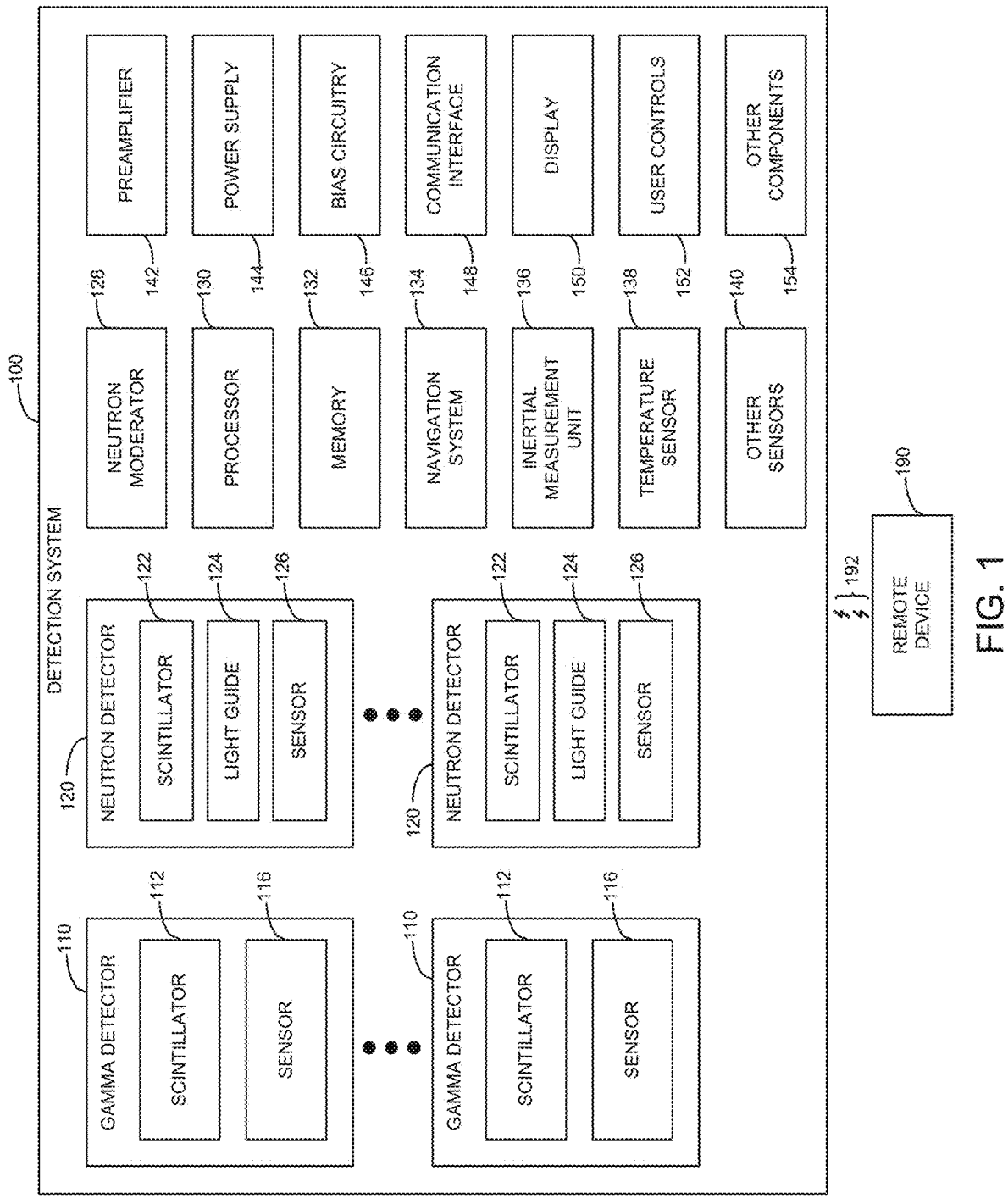
FIG. 1 illustrates a block diagram of a detection system in accordance with an embodiment of the disclosure.

Embodiments of the present invention and their advantages are best understood by referring to the detailed description that follows. It should be appreciated that like

DETAILED DESCRIPTION

In accordance with various embodiments discussed herein, a detection system and related methods are provided to detect the direction and location of one or more radiation sources. For example, by providing multiple radiation detectors (e.g., gamma detectors) that are adjacent to each other, the detectors may at least partially or fully occlude (e.g., shield) each other such that the detectors may detect different radiation counts in response to the same external radiation source.

In this regard, when two gamma detectors placed adjacent to each another, the direction of a radiation source can be determined within 180 degrees (e.g., left or right) in some embodiments and within significantly smaller ranges of angles as further discussed herein. This is due to the absorption of radiation by the occluding detector. By comparing the different radiation counts and/or energy spectra to predetermined radiation counts and/or energy spectra associated with known radiation sources at known directions, the direction (e.g., angles or angle ranges) of a detected radiation source can be determined.

Direction determination can be further enhanced by repositioning (e.g., moving) the detection system along any direction and/or by rotation of the detection system to detect radiation at different known locations within a detection environment. A histogram of data associated with the movement of the detection system can be used to determine the direction of the radiation source within a very small angular cone. For example, in some embodiments, the highest radiation counts may be correlated with a location or orientation provided by a navigation system and/or inertial measurement unit.

In addition, by making multiple direction determinations for different known locations of the detection system, the position of the radiation source may be determined and mapped. Also, detected radiation counts and/or energy spectra may be used to discriminate between multiple radiation sources in a detection environment and determine the types of radiation sources detected.

Thus, by using the occlusion properties of multiple adjacent detectors, the detection system is not required to provide or manipulate complex masks or shielding systems to discern the distribution or direction of radiation sources. Moreover, the use of multiple adjacent detectors as discussed herein improves upon conventional Compton cameras and imagers that typically require long count times and high cost, or Bayesian localization and machine learning techniques that may be computationally complex.

Also in accordance with embodiments discussed herein, a detection system and related methods are provided to include gamma detectors and neutron detectors together in a compact modular form factor. For example, by implementing neutron detectors in the form of elongate (e.g., flat) panels, multiple neutron detectors may be disposed around multiple gamma detectors to perform both neutron and gamma detection while also detecting the direction and location of one or more radiation sources using the gamma detector occlusion principles discussed herein.

FIG. 1 illustrates a block diagram of a detection system 100 in accordance with an embodiment of the disclosure. Detection system 100 may be implemented with different form factors for use with different physical platforms in various environments. For example, in some embodiments, detection system 100 may be implemented in a modular form that is ruggedized and scalable for deployment as a personal radiation detector (PRD), a spectroscopic personal radiation detector (SPRD), a man-portable radiation detector system (MRDS), a radioisotope identifying detector (RIID), an unmanned aerial vehicle (UAV), an unmanned ground vehicle (UGV), an unmanned surface vehicle (USV), an unmanned underwater vehicle (UUV), an unmanned spacecraft, a portal monitor, and/or an imaging device.

Detection system 100 includes a plurality of radiation detectors 110 and 120. In particular, gamma detectors 110 are configured to detect gamma radiation. Although two gamma detectors 110 are explicitly shown, any desired number of gamma detectors may be provided. As further discussed herein, gamma detectors 110 may be positioned adjacent to each other such that at one or more of gamma detectors 110 at least partially occludes one or more other gamma detectors 110 in relation to a radiation source.

Gamma detectors 110 include scintillators 112 configured to emit photons in response to incident gamma radiation. In some embodiments, scintillators 112 may be implemented by various types of scintillating materials such as sodium iodide (NaI), cesium iodide (CsI), lanthanum bromide (LaBr), cerium bromide (CeBr), and/or other materials.

Gamma detectors 110 also include sensors 116 configured to receive the photons provided by scintillators 112 and convert them into electric pulses to detect gamma radiation counts and energy spectra associated with the photons. In various embodiments, sensors 116 may be implemented as photosensors (e.g., silicon photomultipliers and/or others) and/or semiconductors (e.g., germanium (Ge) and/or others).

In some embodiments, gamma detectors 110 may be implemented with semiconductors using, for example, cadmium zinc telluride (CdZnTe), thallium bromide (TlBr), and/or other materials that convert gamma radiation into electrons and holes and output electrical pulses.

Gamma detection information (e.g., signals comprising analog or digital data and also referred to as sensor information) from sensors 116 may be provided to processor 130. Such gamma detection information may include, for example, gamma radiation counts, gamma radiation count rates, energy spectra associated with the gamma radiation counts, and/or data to be used by processor 130 to determine the counts, count rates, and/or energy spectra.

Detection system 100 also includes a plurality of neutron detectors 120 configured to detect neutron radiation. Although two neutron detectors 120 are explicitly shown, any desired number of neutron detectors may be provided. As further discussed herein, neutron detectors 120 may be implemented as panels positioned in a manner that surrounds (e.g., encircles) gamma detectors 110 to provide a compact modular implementation of detection system 100.

Neutron detectors 120 include scintillators 122 configured to emit photons in response to incident neutron radiation. In some embodiments, scintillators 122 may be implemented by various types of scintillating materials (e.g., neutron conversion materials) such as lithium compounds, boron compounds, and/or other materials.

Neutron detectors 120 also include light guides 124 configured to pass photons (e.g., fluorescence) from scintillators 122 to sensors 126. Neutron detectors 120 also include sensors 126 configured to receive the photons provided by scintillators 122 and convert them into electric pulses. Sensors 126 which may be implemented, for example as photosensors and/or semiconductors as previously discussed with regard to sensors 116. In some embodiments, neutron detectors 120 may further include wavelength shifters.

Neutron detection information (e.g., signals comprising analog or digital data and also referred to as sensor information) from sensors 126 may be provided to processor 130. Such neutron radiation detection information may include, for example, neutron radiation counts, neutron radiation count rates, and/or data to be used by processor 130 to determine the counts and/or count rates.

Detection system 100 also includes a neutron moderator 128 which may surround (e.g., encircle) neutron detectors 120. In this regard, neutron moderator 128 operates to reduce the speed of incident neutrons to increase the probability of detection. As further discussed herein, neutron moderator 128 may surround neutron detectors 120 and gamma detectors 110 in a modular implementation of detection system 100. In some embodiments, neutron moderator 128 may be implemented using one or more hydrogen-rich materials (e.g., high-density polyethylene) to perform neutron moderation while also providing a protective shell.

As discussed, processor 130 receives detection information from sensors 116 and 126 to determine overall numbers of radiation counts, radiation count rates, and energy spectra. In addition, processor 130 may be used to cause detection system 100 to perform any of the operations discussed herein. In various embodiments, processor 130 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices. In this regard, processor 130 may execute machine readable instructions (e.g., software, firmware, or other instructions) stored in memory 132.

In various embodiments, processor 130 may process the detection information received from sensors 116 and 126 to build an energy histogram and perform radiation source identification. Such data may be integrated with data received from any other portions of detection system 100 for additional situational awareness.

Memory 132 may be implemented as a machine readable medium storing various machine readable instructions and data. For example, in some embodiments, memory 132 may store an operating system and one or more applications as machine readable instructions that may be read and executed by processor 130 to perform various operations described herein. Memory 132 may also store various types of data discussed herein, such as radiation counts, count rates, count ratios, energy spectra, position information, radiation maps, and/or other information associated with various radiation sources. For example, in some embodiments, memory 132 may store the ratio of gamma radiation counts received by at least two gamma detectors 110 in response to a known radiation source at various angles of incidence. These predetermined count ratios may be compared with newly determined count ratios to identify the type and direction of a new radiation source. In some embodiments, memory 132 may be implemented as non-transitory non-volatile memory (e.g., flash memory, hard drive, solid state drive, or others), volatile memory, or combinations thereof.

Navigation system 134 may be used to detect the location of detection system 100 in accordance with various navigation signals, such as global positioning signals and/or other types of navigation signals as appropriate. In some embodiments, navigation system 134 may include a compass or other appropriate directional devices.

Inertial measurement unit 136 may be used to detect and trace the relative movement of detection system 100, for example, as a user or a vehicle moves through space in relation to various radiation sources. This can permit detection system 100 to ascertain the relative location of radiation sources detected by gamma detectors 110. Moreover, by using the location information provided by navigation system 134, the relative location information provided by inertial measurement unit 136, and the radiation detection information provided by gamma detectors 110, detection system 100 may further determine the absolute location of radiation sources. In various embodiments, inertial measurement unit 136 may be implemented using an accelerometer, gyroscope, magnetometer, and/or other devices.

Temperature sensor 138 detects the temperature of the environment and/or detectors 110/120 to operate detectors 110/120 in a stabilized manner in accordance with pre-calibrated gain settings. Other sensors 140 may be provided for measuring additional information as appropriate for particular implementations of detection system 100.

One or more preamplifiers 142 operate to amplify signals provided by gamma detectors 110 and neutron detectors 120 for further use by processor 130. Power supply 144 provides electrical power to operate the various components of detection system 100. For example, in the case of a mobile implementation of detection system 100, power supply may be a battery. Bias circuitry 146 receives electrical power from power supply 144 and provides appropriate voltage and/or current bias signals to sensors 116 and 126 to operate gamma detectors 110 and neutron detectors 120.

Communication interface 148 may be implemented as one or more wireless interfaces (e.g., WiFi, Bluetooth, cellular, infrared, radio, and/or other types) and/or wired interfaces (e.g., Universal Serial Bus (USB), Ethernet, and/or other types). In this regard, communication interface 148 may send and/or receive communication signals 192 to and/or from a remote device 190. In some embodiments, remote device 190 may be implemented as a smart phone or tablet running one or more applications (e.g., using a processor and memory in a similar manner as discussed with regard to processor 130 and memory 132). For example, in some embodiments, detection system 100 may provide information to remote device 190 (e.g., radiation detection results and/or radiation maps) and may receive commands therefrom. In some embodiments, the processing performed by processor 130 may be performed by remote device 190 and vice versa.

Display 150 presents information to a user of detection system 100. In various embodiments, display 150 may be implemented as a liquid crystal display (LCD), an organic light emitting diode (OLED) display, and/or any other appropriate display.

User controls 152 receive user input to operate detection system 100. In various embodiments, user controls 152 may be implemented by one or more buttons, keyboards, levers, joysticks, and/or other controls. In some embodiments, user controls 152 may be integrated with display 150 as a touchscreen.

Other components 154 may also be provided as appropriate to support, for example, particular implementations of detection system 100. For example, in some embodiments, other components 154 may include one or more propulsion systems, actuators, attachment mechanisms, and/or other features to move detection system 100 and/or secure detection system 100 to a user or other platform (e.g., a vehicle).

Figure 2:
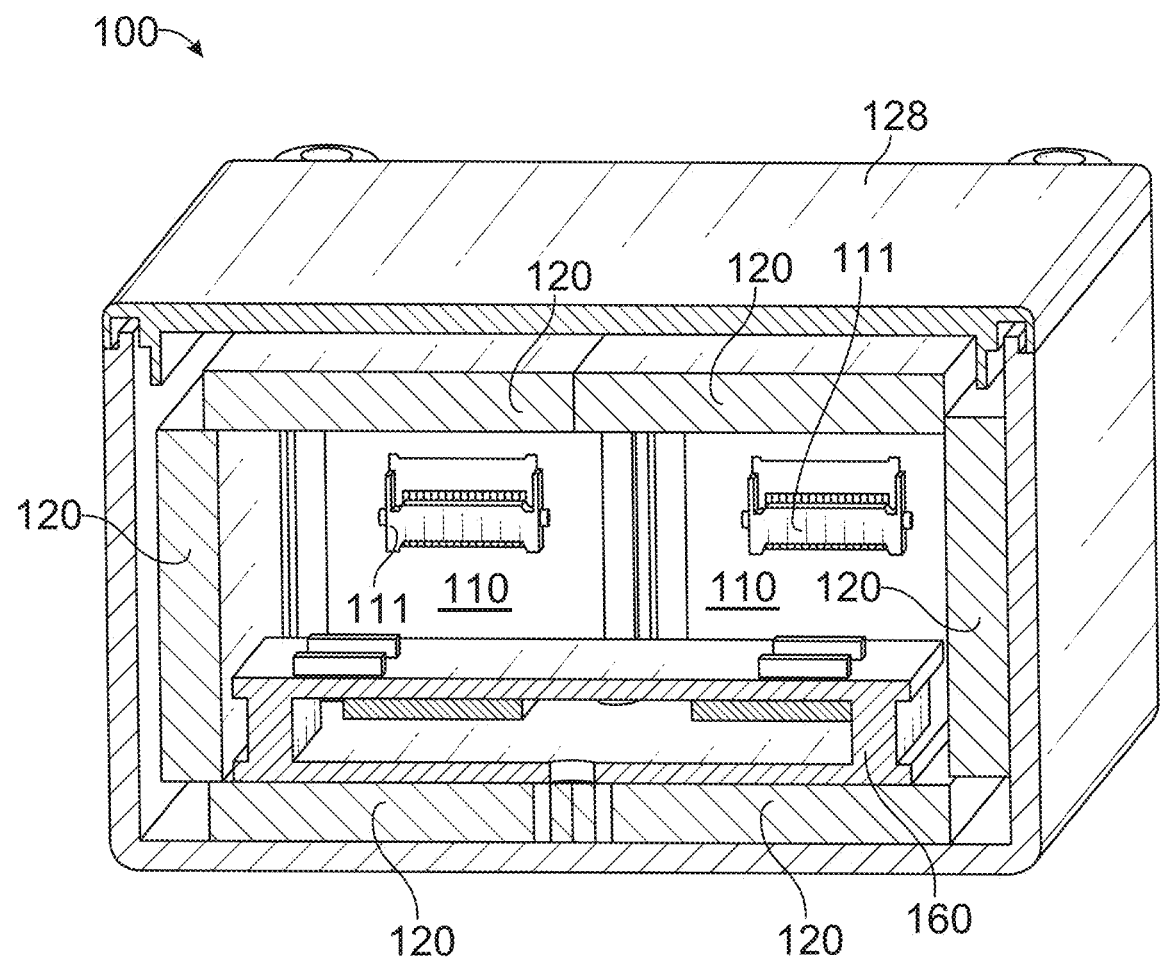
FIG. 2 illustrates an implementation of a detection system in accordance with an embodiment of the disclosure.

FIG. 2 illustrates an implementation of detection system 100 in accordance with an embodiment of the disclosure. In the particular embodiment shown in FIG. 2, detection system 100 is implemented as a modular system with two gamma detectors 110 and six neutron detectors 120. However, any desired number of each type of detector may be provided in various geometries.

In this embodiment, the two gamma detectors 110 include circuit boards that also include connectors 111 for attaching any of the various components of FIG. 1 to the gamma detectors 110. Also in this embodiment, the six neutron detectors 120 are each implemented by an elongate panel such that they surround the two gamma detectors 110 as shown. By implementing neutron detectors 120 as elongate panels as shown, they can be positioned to closely wrap around gamma detectors 110 more efficiently than would be possible using conventional neutron detectors they typically rely on helium-3 tubes.

In addition, neutron moderator 128 is provided as an outer shell that surrounds the neutron detectors 120 to reduce the speed of incident neutrons received from the outside environment before they pass to neutron detectors 120. Also, this embodiment includes a support structure 160 which may be used, for example, as a mounting platform to receive any of the components of FIG. 1.

Thus, it will be understood that detection system 100 may be implemented in a modular system with gamma detectors 110, neutron detectors 120, and neutron moderator 128 provided in an efficient and compact manner. In particular, by implementing neutron detectors 120 as elongate panels, they can be conveniently positioned around the gamma detectors to save space while still being further surrounded by neutron moderator 128 which effectively acts as a protective shell around the gamma detectors 110 and neutron detectors 120 while still providing neutron moderation.

Although two gamma detectors 110 are shown in a 2×1 array in FIG. 2, other configurations are contemplated. For example, any desired number of gamma detectors 110 may be provided in various arrays such as 3×1, 2×2, and so on. Similarly, the number of neutron detectors 120 can be increased or decreased as to surround the gamma detectors 110 as appropriate.

Moreover, although a rectangular arrangement of gamma detectors 110 is illustrated in FIG. 2, other arrangements may be provided (e.g., non-rectangular and/or irregular arrangements) while still providing the benefits discussed herein.

Figure 3:
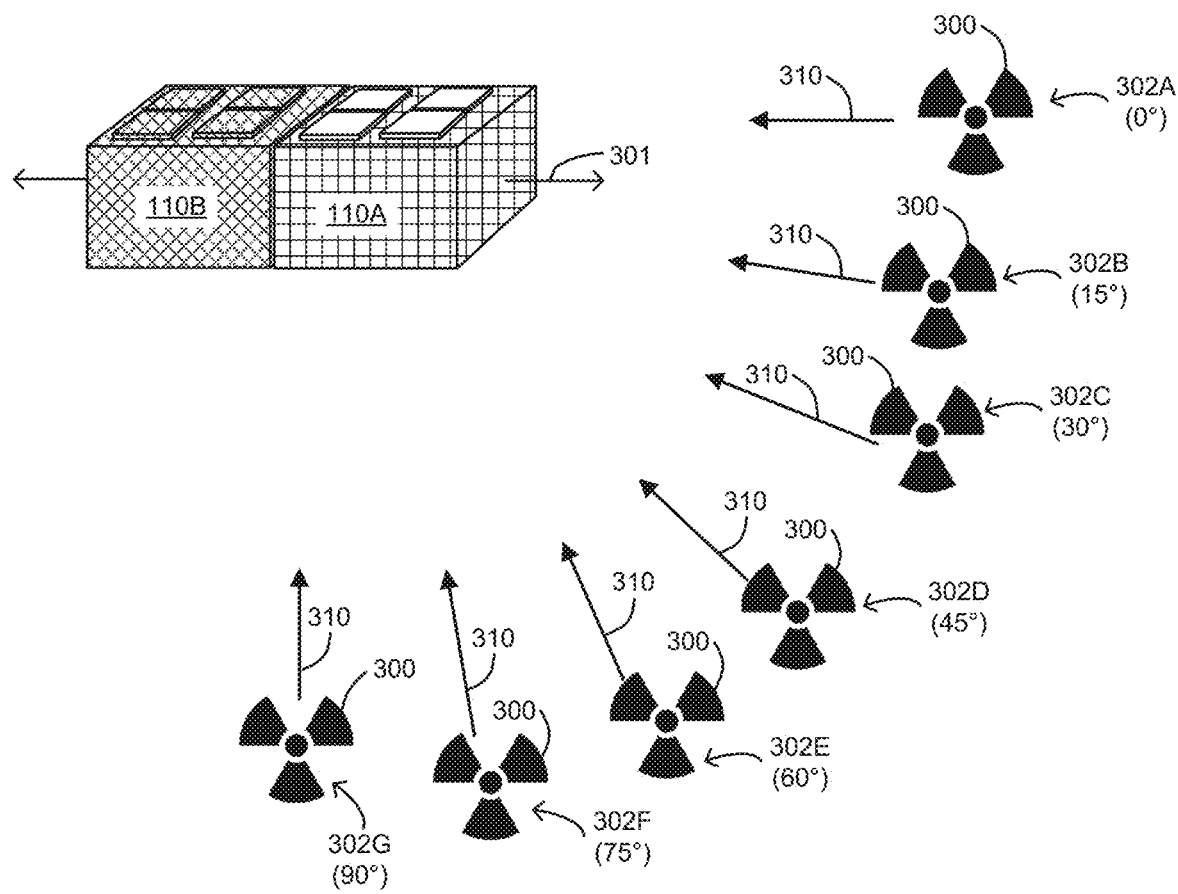
FIG. 3 illustrates radiation detectors receiving radiation from a radiation source positioned at various angles in accordance with an embodiment of the disclosure.

FIG. 3 illustrates two gamma detectors 110 of detection system 100 receiving radiation from a radiation source 300 (e.g., isotope) selectively positioned at various angles in accordance with an embodiment of the disclosure. For ease of discussion, the two gamma detectors 110 are individually identified as gamma detector 110A and gamma detector 110B and are illustrated alone without the remaining components of detection system 100. Radiation source 300 emits gamma radiation 310 and, in some embodiments may also emit neutron radiation as further discussed herein.

As shown, gamma detectors 110A and 110B are positioned adjacent to each other and are aligned along an axis 301. A radiation source 300 is shown at different positions 302A to 302G, each of which causes radiation source 300 to emit gamma radiation 310 toward gamma detectors 110A and 110B at a different angle of incidence (e.g., measured in relation to axis 301) for each position. For example, at position 302A, radiation source 300 emits gamma radiation 310 at an angle of 0 degrees parallel to axis 301. At position 302G, radiation source 300 emits gamma radiation 310 at an angle of 90 degrees perpendicular to axis 301. At intermediate positions 302B-F, radiation source 300 emits gamma radiation 310 at 15 degrees, 30 degrees, 45 degrees, 60 degrees, and 75 degrees relative to axis 301, respectively. Although different angles of 15 degree increments are shown distributed along a horizontal plane, any desired positions may be used in other directions as desired.

As a result of the adjacent positioning of gamma detectors 110A and 110B, gamma detector 110A may occlude gamma detector 110B with regard to gamma radiation 310 received from certain angles (e.g., directions). In this regard, gamma detector 110A may at least partially shield gamma detector 110B relative to radiation source 300. For example, when radiation source 300 is at position 302A, gamma detector 110A fully occludes gamma detector 110B. In this case, gamma detector 110A will receive gamma radiation 310 directly from radiation source 300. Meanwhile, gamma detector 110B will receive at least some of gamma radiation 310 only after it has already passed through and become attenuated by gamma detector 110A. As a result, gamma detector 110A will receive higher numbers of radiation counts than gamma detector 110B when radiation source 300 is at position 302A.

Similarly, for each of positions 300B-300F, gamma detector 110A will continue to at least partially occlude gamma detector 110B, thus causing gamma detector 110A to continue receiving higher numbers of radiation counts than gamma detector 110B. However, as radiation source 300 transitions through positions 300B to 300E, the amount of occlusion diminishes as gamma detector 110B receives a higher proportion of gamma radiation 310 directly from radiation source 300 rather than passed through gamma detector 110A. As a result, the ratio of radiation counts received by gamma detector 110A in relation to gamma detector 110B will vary based on the particular location of radiation source 300.

Finally, for position 300G (e.g., 90 degrees), gamma detector 110A no longer occludes gamma detector 110B. In this case, gamma detectors 110A and 110B may receive substantially the same number of radiation counts in response to gamma radiation 310. As a result, the ratio of radiation counts received by gamma detector 110A in relation to gamma detector 110B will be approximately equal to 1.

Figure 4:
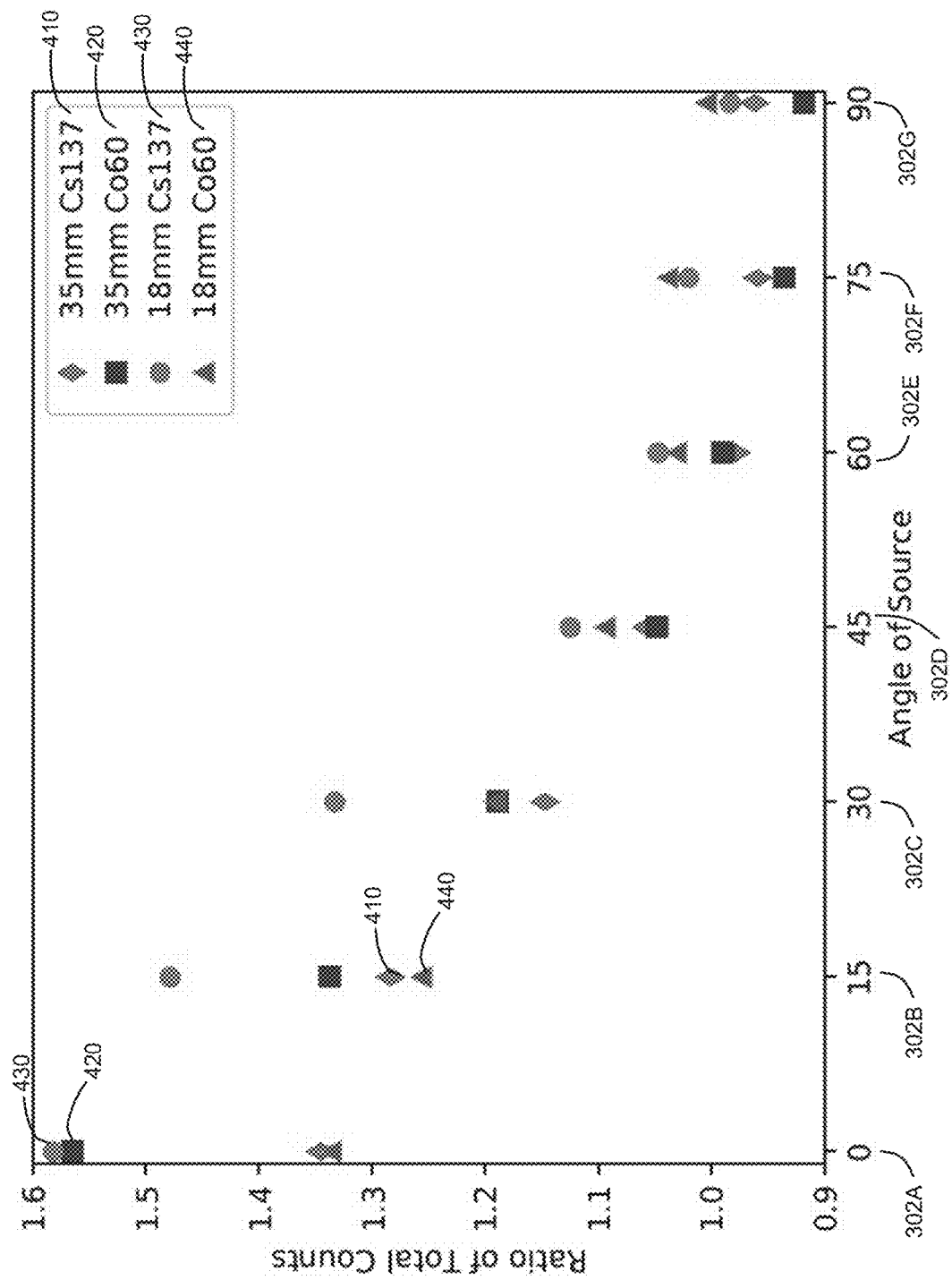
FIG. 4 illustrates ratios of radiation counts detected by radiation detectors from different radiation sources at various angles in accordance with an embodiment of the disclosure.

These principles can be further understood with reference to FIG. 4 which illustrates ratios of radiation counts received by gamma detectors 110A and 110B from different types of radiation sources at various angles in accordance with an embodiment of the disclosure. In particular, FIG. 4 identifies plots 410 to 440 corresponding to the ratios of total radiation counts received for different configurations of gamma detectors 110A and 110B and different types of radiation sources 300.

To provide plots 410 to 440, gamma detectors 110A and 110B were implemented with different sizes (e.g., both implemented as 35 $mm^3$ detectors or both implemented as 18 $mm^3$ detectors) and tested to observe the angular dependence on their radiation count ratios in relation to radiation source 300. By examining the ratio of counts observed between gamma detectors 110A and 110B, it is possible to discern whether or not radiation source 300 is within a cone of varying degrees based on the counting time and spectral data. In this regard, the raw counts in a low background environment are sufficient to distinguish a 48 µCi 137Cs or 10 µCi 60Co radiation source 300 placed 50 cm away for both detector sizes. It is also possible to further determine if the 48 µCi 137Cs radiation source 300 is within a 30 degree cone for 35 $mm^3$ gamma detectors 110A and 110B at a distance of 200 cm.

Plot 410 was obtained using gamma detectors 110A and 110B provided with scintillators 112 implemented by CsI cubes of 35 mm lengths coupled to sensors 116 implemented with silicon photomultipliers (SiPMs) with four quads in a 2×2 configuration where a quad is made-up of four 6×6 mm2 SiPMs in a 2×2 configuration (e.g., effectively 16 SiPMs). In addition, plot 410 utilized radiation source 300 implemented by 48 μCi 137Cs positioned at a distance of 200 cm from gamma detectors 110A and 110B.

Plot 420 was obtained using gamma detectors 110A and 110B implemented in the manner of plot 410 and with radiation source 300 implemented by 10 μCi 60Co positioned at a distance of 50 cm from gamma detectors 110A and 110B.

Plot 430 was obtained using gamma detectors 110A and 110B provided with scintillators 112 implemented by CsI cubes of 18 mm lengths coupled to sensors 116 implemented with four 6×6 mm2 SiPMs in a 2×2 configuration. In addition, plot 430 utilized radiation source 300 implemented by 48 μCi 137Cs positioned at a distance of 50 cm from gamma detectors 110A and 110B.

Plot 440 was obtained using gamma detectors 110A and 110B implemented in the manner of plot 430 and with radiation source 300 implemented by 10 μCi 60Co positioned at a distance of 50 cm from gamma detectors 110A and 110B.

For each of plots 410-440, radiation source 300 was moved in 15 degree increments relative to gamma detectors 110A and 110B in a horizontal plane through positions 302A to 302G (e.g., from 0 degrees to 90 degrees). Each measurement was taken for five minutes to provide a baseline measurement was achieved.

As shown in FIG. 4, the ratio of total counts observed by gamma detectors 110A and 110B varies based on the angle of incidence for all of plots 410 to 440 regardless of the particular detector implementation or type of radiation source 300. As a result of this angular dependence, processor 130 may be used to determine the direction of radiation source 300 relative to detection system 100 using the ratio of counts between gamma detectors 110A and 110B.

For example, as shown in FIG. 4, significant changes in the ratio of counts are exhibited from position 302A through position 302B. As a result, by determining the ratio between radiation counts, processor 130 may be able to determine the direction of radiation source 300 within a cone of 30 degrees (e.g., corresponding to ±15 degrees centered on axis 301).

Indeed, changes in the ratio of counts continue to be exhibited through position 302C where the ratio still remains above 1.1. As a result, processor 130 may be able to determine the direction of radiation source 300 within a cone of 60 degrees (e.g., corresponding to ±30 degrees centered on axis 301).

Moreover, in some embodiments, the direction of radiation source 300 may be determined to a desired degree of accuracy depending on various factors including, for example, the configuration of the various detectors 110, the count rate incident upon the detectors 110, the counting time, and/or the position of the radiation source 300 relative to the detectors. For example, if the radiation source 300 is positioned at location 302G (e.g. 90 degrees where no occlusion is occurring), then detection system 100 may be moved as appropriate to introduce occlusion to resolve which side (e.g., left or right) the radiation source 300 is positioned.

As also shown in FIG. 4, larger gamma detectors 110A/110B may result in higher count ratios due to the larger amount of shielding and radiation absorption afforded by their larger volume. For example, plot 420 (corresponding to the larger 35 mm³ size) exhibits a significantly higher count ratio in comparison to plot 440 (corresponding to the smaller 18 mm³ size) at positions 302A and 302B. This is particularly clear with regard to position 302A which is incident along axis 301 at an angle of 0 degrees.

For plots 410 and 420, the average background gamma radiation was 29.3 counts per second and 30.7 counts per second for gamma detectors 110A and 110B, respectively. Also for plot 410, the combined average background gamma radiation was 151 counts per second including both gamma detectors 110A and 110B, while for plot 420 it was 60 counts per second. For plots 430 and 440, the average background gamma radiation was 7.3 counts per second and 7.0 counts per second for gamma detectors 110A and 110B, respectively. The increased background radiation associated with plot 410 results in its count ratio being closer to 1 than the other plots where the background radiation was less than 20% of the count rate with radiation source 300 present at 50 cm.

Also in FIG. 4, the effect of detector size on linear attenuation can be seen by comparing the ratios of the total counts of plots 420 and 440 corresponding to 35 mm3 and 18 mm3 gamma detectors 110A/110B. Although the larger 35 mm3 gamma detectors 110A/110B exhibit a larger solid angle to receive gamma radiation, the 35 mm3 size causes more absorption than the 18 mm3 and thus results in a larger count ratio as demonstrated by plots 420 and 440 at position 302A.

Also in FIG. 4, the effect of detector size on absorption efficiency is evident by comparing the ratios of plots 430 and 440 using 18 mm³ detectors with different 48 μCi 137Cs and 10 μCi 60Co radiation sources 300, respectively. In this regard, the total counts observed for the 10 μCi 60Co radiation source 300 was much lower owing to its higher energy peaks. Although the count ratios begin to converge past position 302C (e.g., 30 degrees), there is nevertheless a large difference between the count ratios from position 302A through position 302C (e.g., from 0 degrees through 30 degrees). In some embodiments, the convergence of the count ratios beyond position 302C may be caused by faces of gamma detectors 110A and 110B exhibiting reduced occlusion in relation to each other. Accordingly, various adjustments may be made to provide a desired detector configuration in accordance with various design considerations of detection system 100 including, for example, count time, efficiency, cost, form factor, and other factors.

In some cases, the ratio of counts may be increased by considering only the counts near peak positions (e.g., peak energy spectra corresponding to particular energy bands) for radiation source 300. In particular, by isolating the dependence of directionality on radiation counts located around the peaks while ignoring the background radiation, the count ratios may be increased for more accurate processing and location determination. For example, FIGS. 5 and 6 illustrate radiation counts detected by gamma detectors 110A and 110B from different radiation sources 300 at an angle of maximum occlusion (e.g., at position 302A along axis 301) in accordance with embodiments of the disclosure.

Figure 5:
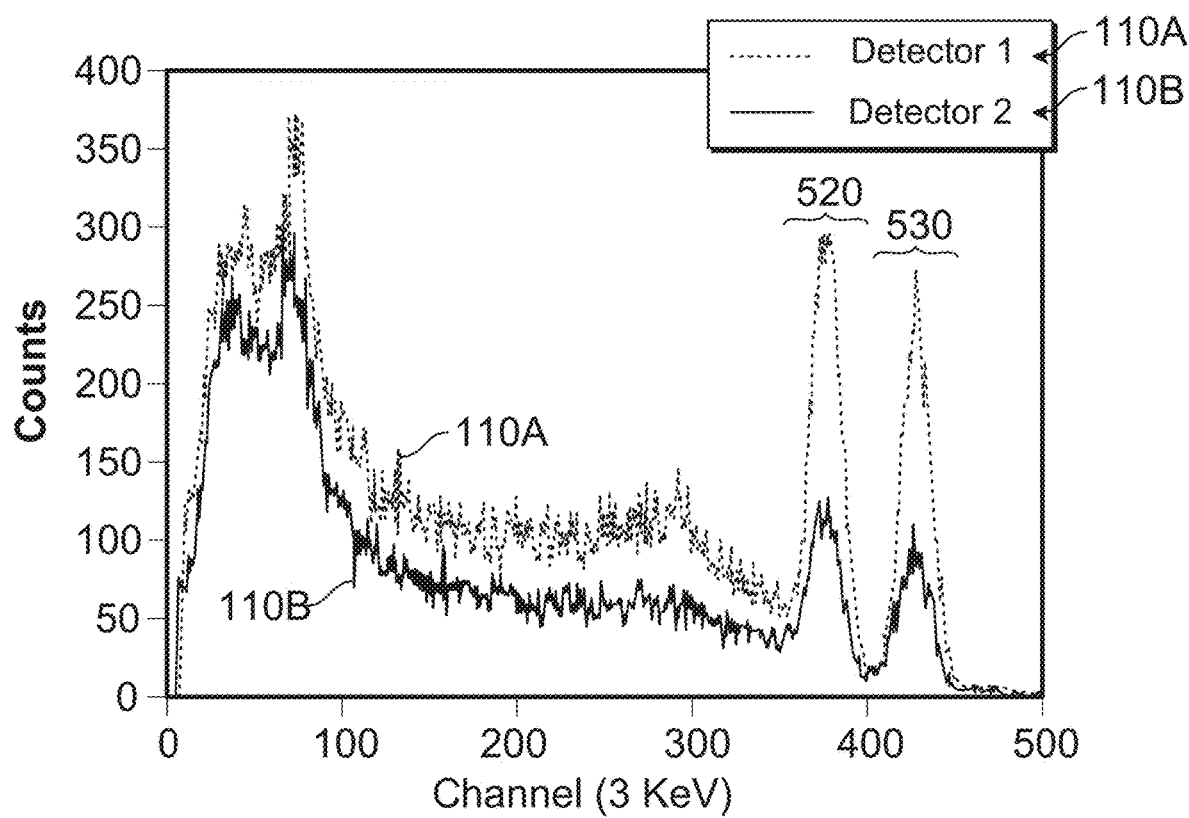
FIGS. 5 and 6 illustrate radiation counts detected by radiation detectors from different radiation sources at an angle of maximum occlusion in accordance with embodiments of the disclosure.

In particular, FIG. 5 illustrates the radiation counts and corresponding energy spectra detected by 35 mm³ gamma detectors 110A and 110B from a 10 μCi 60Co radiation source 300 at position 302A at a distance of 50 cm (e.g., corresponding to position 302A of plot 420). In this case, a total of 61811 counts were detected by gamma detector 110A and a total of 39502 counts were detected by gamma detector 110B. As shown in FIG. 5, energy bands 520 and 530 exhibit substantial differences in the counts detected by gamma detectors 110A and 110B.

Figure 6:
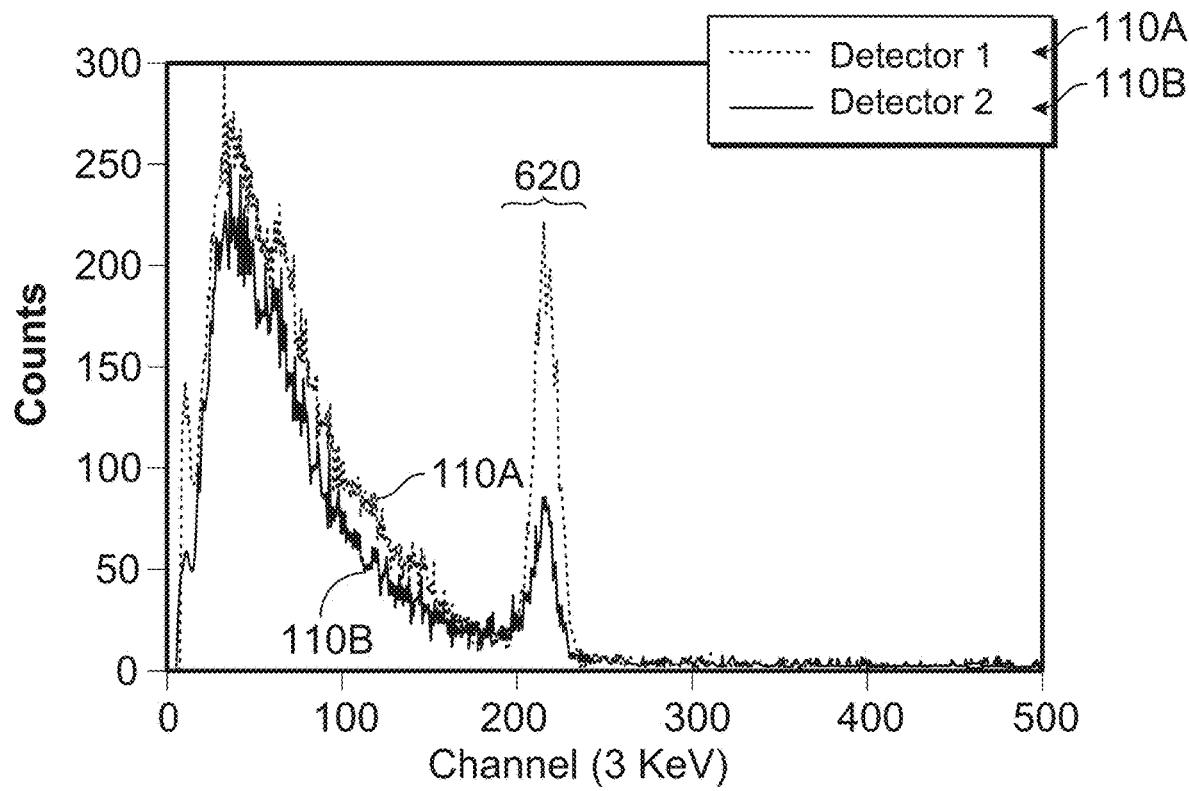

FIG. 6 illustrates the radiation counts and corresponding energy spectra detected by 35 mm$^3$ gamma detectors 110A and 110B from a 48 µCi 137Cs radiation source 300 at position 302A at a distance of 200 cm (e.g., corresponding to position 302A of plot 410). In this case, a total of 25591 counts were detected by gamma detector 110A and a total of 19024 counts were detected by gamma detector 110B. As shown in FIG. 6, energy bands 620 exhibits substantial differences in the counts detected by gamma detectors 110A and 110B. In particular, the ratio of counts near the 662 keV peak at energy band 620 is 2.89 which is significantly larger than the overall ratio of 1.35 for the total counts (e.g., see plot 410 at position 302A in FIG. 4).

Thus, by using the ratio of counts corresponding to particular energy bands (e.g., energy bands 520, 530, and 620 in FIGS. 5 and 6), processor 130 may more effectively isolate radiation source 300 from background radiation. In some embodiments, processor 130 may determine the directions of multiple radiation sources 300 using each isotope's unique peak count ratios. In this regard, count times may be extended as appropriate and additional sensor fusion processing such as a Kalman filter may be used.

Figure 7:
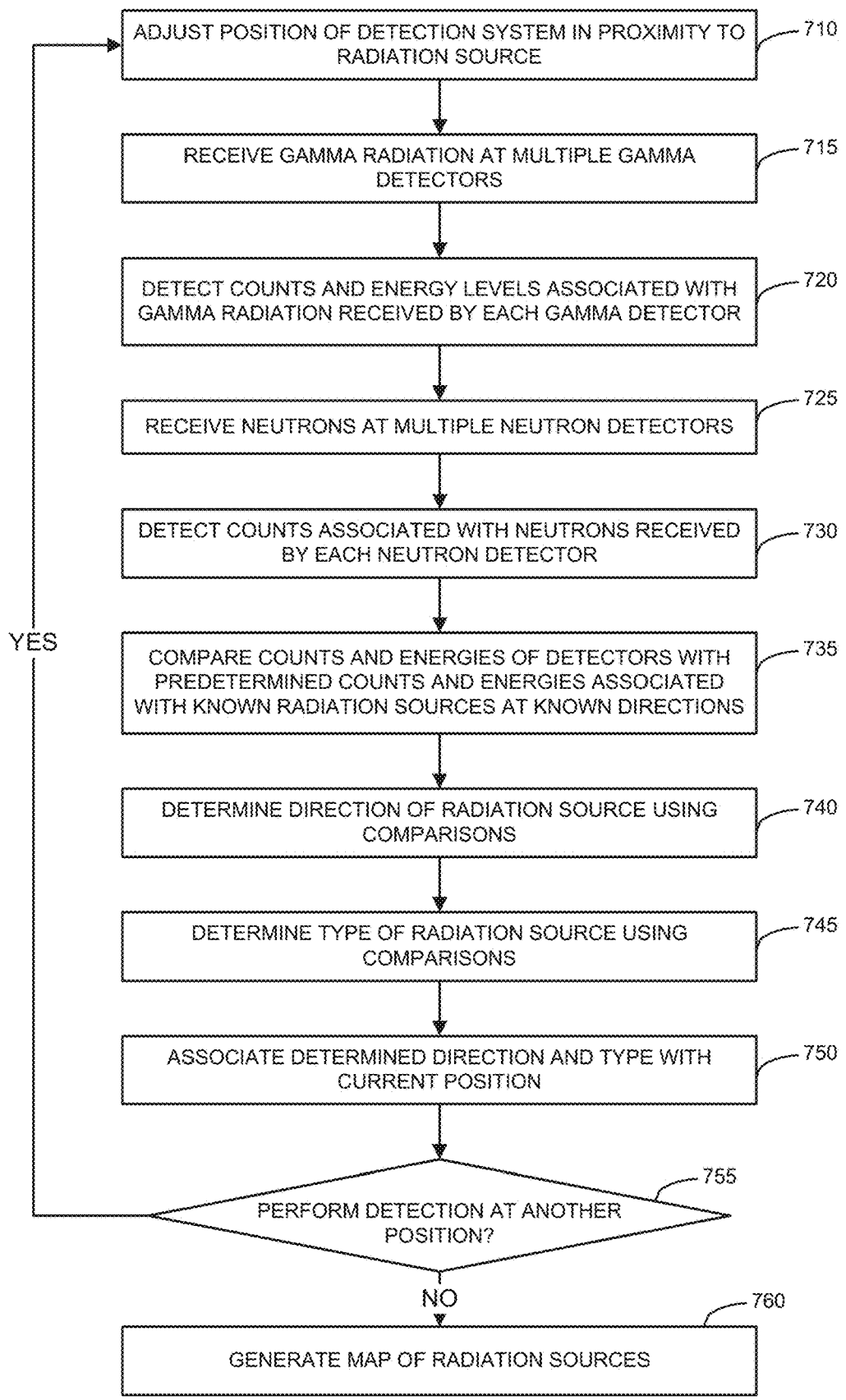
FIG. 7 illustrates a process of operating a detection system in accordance with an embodiment of the disclosure.

FIG. 7 illustrates a process of operating detection system 100 in accordance with an embodiment of the disclosure. In block 710, detection system 100 is initially positioned in proximity to radiation source 300 which may be an unknown radiation source 300 at an unknown distance and unknown direction. For example, in the case of a user-mounted implementation of detection system 100 (e.g., a PRD, SPRD, MRDS, or other system) the user may position themselves in proximity to radiation source 300 while wearing (e.g., attached to the user's person, clothing, in a backpack, and/or any appropriate location), holding, and/or otherwise supporting detection system 100. In other cases, detection system 100 may be positioned manually and/or remotely (e.g., by maneuvering any of the various vehicles and/or platforms discussed herein into position).

In block 715, the two or more gamma detectors 110 (e.g., gamma detectors 110A and 110B as discussed) receive gamma radiation from radiation source 300. In block 720, the two or more gamma detectors 110 detect the gamma radiation counts and energy spectra associated with the received gamma radiation. For example, gamma detection information from sensors 116 of gamma detectors 110 may be provided to processor 130 to count the number of gamma emissions received over time and record the number of counts, the count rate, and the energy level associated with each count. In various embodiments, blocks 715 and 720 may be performed simultaneously during a predetermined length of time (e.g., a predetermined detection period) and/or until a sufficient number of gamma radiation counts have been received.

In block 725, one or more neutron detectors 120 receive neutron radiation from radiation source 300. In this regard, radiation source 300 may emit both gamma radiation and neutron radiation to be detected by gamma detectors 110 and neutron detectors 120, respectively. In block 730, the neutron detectors 120 detect neutron radiation counts associated with the received neutron radiation. For example, neutron detection information from sensors 126 may be provided to processor 130 to count the number of neutron radiation emissions received over time and thus record the number of counts and the count rate. In various embodiments, blocks 725 and 730 may be performed simultaneously during a predetermined length of time (e.g., a predetermined detection period) and/or until a sufficient number of neutron radiation counts have been received.

Also, in some embodiments, blocks 715 through 730 may be performed simultaneously such that gamma radiation and neutron radiation may be simultaneously detected by detection system 100 using gamma detectors 110 and neutron detectors 120, respectively. In this regard, the compact modular implementation of detection system 100 (e.g., discussed with regard to FIG. 2) may be advantageously used to permit both gamma radiation and neutron radiation to be simultaneously detected in an efficient manner even in high radiation fields.

In block 735, processor 130 compares the gamma detection information (e.g. gamma radiation counts and gamma radiation energy spectra) and neutron detection information (e.g., neutron radiation counts) with predetermined gamma detection information and predetermined neutron detection information stored in memory 132 which are associated with known radiation sources at known directions. For example, processor 130 may compare the gamma radiation counts provided by gamma detectors 110A and 110B with known gamma radiation counts associated with different directions that have been previously determined by prior testing using known radiation sources at known directions.

In some embodiments, the comparisons performed in block 735 may include determining the ratio of gamma detector counts associated with gamma detectors 110A and 110B and comparing the determined count ratio to predetermined count ratios. Other types of calculations are also contemplated for the comparisons.

Also, in some embodiments, the comparisons performed in block 735 may be limited to certain energy bands that exhibit significant differences in the gamma radiation counts determined by gamma detectors 110A and 110B. For example, as discussed with regard to FIGS. 5 and 6, certain energy bands (e.g., energy bands 520, 530, and 620) may exhibit substantial differences in counts for particular radiation sources 300. By limiting the comparisons to these or other selected energy bands, higher count ratios may be determined and utilized for more accurate analysis.

In block 740, processor 130 determines the direction of radiation source 300 using the comparisons performed in block 735. As discussed with regard to FIGS. 3-6, the direction of radiation source 300 may correlate to the gamma radiation counts detected by gamma detectors 110A and 110B when positioned adjacent to each other such that gamma detector 110A at least partially occludes gamma detector 110B. Thus, by comparing the counts detected by gamma detectors 110A and 110B with known gamma radiation counts associated with known directions, processor 130 may determine a correlation (e.g., through comparison, interpolation, and/or other processing techniques) between the gamma radiation counts detected by gamma detectors 110A and 110B and predetermined gamma radiation counts associated with a predetermined direction. Thus, processor 130 may determine the direction (e.g., angular location) of radiation source 300 with high confidence.

In block 745, processor 130 determines the type of radiation source 300 (e.g., a particular isotope) using the comparisons performed in block 735. For example, certain radiation sources may exhibit gamma radiation in particular energy bands and/or known relationships between detected gamma radiation and detected neutron radiation. Accordingly, by comparing the detected gamma radiation counts, detected gamma radiation energy spectra, and detected neutron radiation counts to known values stored in memory 132, processor 130 may correlate the detected values with known values associated with a known radiation source to identify the particular type of radiation source 300 being detected (e.g., a 48 µCi 137Cs radiation source, a 10 µCi 60Co radiation source, and/or others).

Although FIG. 7 identifies that the direction of radiation source 300 may be determined (block 740) and the type of radiation source 300 may be determined (block 745), both determinations are not required to be performed. For example, in various embodiments, the direction, the type, and/or both may be determined as appropriate for particular implementations.

In block 750, processor 130 associates the direction determined in block 740 and the radiation source type determined in block 745 with the current position of detection system 100. As discussed, navigation system 134 may be used to detect the location of detection system 100. In addition, inertial measurement unit 136 may be used to further refine this location as detection system 100 moves. Accordingly, processor may store an association between the direction, radiation source type, and current position in memory 132 to provide a record of radiation source 300 for further use in generating a radiation map.

In block 755, processor 130 and/or a user determines whether further detection operations should be performed at another location. In this regard, detection system 100 may be selectively repositioned (e.g., translated and/or rotated) to other locations to again receive radiation and determine the direction and type of the same radiation source 300 or additional radiation sources 300.

If additional locations are to be detected, then the process returns to block 710 where detection system 100 is repositioned and the process repeats. Otherwise, the process continues to block 760.

By repeating the process of FIG. 7 for different positions of detection system 100, processor 130 may generate and store in memory 132 multiple associations between the direction, radiation source type, and position of one or more radiation sources 300. For example, by determining the directions of a radiation source relative to multiple positions of detection system 100, processor 130 may determine a location of the radiation source based on an intersection of the determined directions (e.g., through triangulation, interpolation, and/or other techniques).

Accordingly, in block 760, processor 130 generates a map of radiation sources 300 identifying their locations and radiation source type. In various embodiments, the radiation map may be provided to a user for review (e.g., presented on display 150 and/or remote device 190) and/or to appropriate systems for further processing and analysis.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   a plurality of gamma radiation detectors configured to receive gamma radiation from a radiation source, wherein a first one of the gamma radiation detectors is positioned to at least partially occlude a second one of the gamma radiation detectors to attenuate the gamma radiation received by the second gamma radiation detector;
   a neutron moderator shell;
   a plurality of neutron radiation detectors implemented as panels surrounding the first and second gamma radiation detectors and configured to receive neutron radiation from the radiation source passed by the neutron moderator shell; and
   a processor configured to:
      receive gamma detection information provided by the first and second gamma radiation detectors in response to the gamma radiation,
      receive neutron detection information provided by the neutron radiation detectors in response to the neutron radiation, and
      determine a direction of the radiation source using the detection information.

2. The system of claim 1, wherein the processor is configured to:
   compare the received gamma and neutron detection information with predetermined detection information associated with a predetermined direction;
   determine a correlation between the received gamma and neutron detection information and the predetermined detection information associated with the predetermined direction; and
   wherein the direction of the radiation source is determined using the correlation.

3. The system of claim 2, wherein the gamma detection information comprises a ratio of radiation counts detected by the first and second gamma radiation detectors.

4. The system of claim 1, wherein the direction comprises a range of angles.

5. The system of claim 1, wherein:
   the system is configured to be moved to receive the gamma radiation at the first and second gamma radiation detectors at a plurality of positions; and
   the processor is configured to:
      receive additional gamma detection information provided by the first and second gamma radiation detectors in response to the radiation received for each of the positions,
      determine a direction of the radiation source for each of the positions using the additional gamma detection information, and
      determine a location of the radiation source using the determined directions.

6. The system of claim 5, wherein:
the processor is configured to:
determine locations for a plurality of radiation sources; and
generate a radiation map comprising the determined locations of the radiation sources; and
the system further comprises a communication interface configured to transmit the radiation map to a remote device.

7. The system of claim 1, wherein:
the gamma detection information comprises gamma radiation counts and gamma radiation energy spectra;
the neutron detection information comprises neutron radiation counts; and
the processor is configured to identify the radiation source using the gamma radiation counts, the gamma radiation energy spectra, and the neutron radiation counts.

8. The system of claim 1, wherein the system is configured to be provided on a user and/or on a vehicle.

9. The system of claim 1, further comprising:
an inertial measurement unit configured to detect relative movement of the radiation detectors in relation to the radiation source; and
wherein the processor is configured to:
receive location information provided by a navigation system,
receive relative location information provided by the inertial measurement unit, and
determine an absolute location of the radiation source using the location information, the relative location information, and the detection information.

10. A method comprising:
receiving gamma radiation at a plurality of gamma radiation detectors from a radiation source, wherein a first one of the gamma radiation detectors is positioned to at least partially occlude a second one of the gamma radiation detectors to attenuate the gamma radiation received by the second gamma radiation detector, wherein a plurality of neutron radiation detectors implemented as panels surround the first and second gamma radiation detectors and are configured to receive neutron radiation from the radiation source passed by a neutron moderator shell;
receiving gamma detection information provided by the first and second gamma radiation detectors in response to the radiation;
receiving neutron detection information provided by the neutron radiation detectors in response to the neutron radiation; and
determining a direction of the radiation source using the detection information.

11. The method of claim 10, further comprising:
comparing the received gamma and neutron detection information with predetermined detection information associated with a predetermined direction;
determining a correlation between the received gamma and neutron detection information and the predetermined detection information associated with the predetermined direction; and
wherein the direction of the radiation source is determined using the correlation.

12. The method of claim 11, wherein the gamma detection information comprises a ratio of radiation counts detected by the first and second gamma radiation detectors, wherein the direction comprises a range of angles.

13. The method of claim 10, further comprising:
moving the first and second gamma radiation detectors to receive the gamma radiation at a plurality of positions;
receiving additional gamma detection information provided by the first and second gamma radiation detectors in response to the gamma radiation received for each of the positions;
determining a direction of the radiation source for each of the positions using the additional gamma detection information; and
determining a location of the radiation source using the determined directions.

14. The method of claim 13, further comprising:
determining locations for a plurality of radiation sources;
generating a radiation map comprising the determined locations of the radiation sources; and
transmitting the radiation map to a remote device.

15. The method of claim 10, wherein:
the gamma detection information comprises gamma radiation counts and gamma radiation energy spectra;
the neutron detection information comprises neutron radiation counts; and
the method further comprises identifying the radiation source using the gamma radiation counts, the gamma radiation energy spectra, and the neutron radiation counts.

16. The method of claim 10, wherein the method is performed by a detection system provided on a user and/or on a vehicle.

17. The method of claim 10, further comprising:
receiving location information provided by a navigation system;
receiving relative location information provided by an inertial measurement unit configured to detect relative movement of the radiation detectors in relation to the radiation source; and
determining an absolute location of the radiation source using the location information, the relative location information, and the detection information.

18. A system comprising:
a plurality of radiation detectors configured to receive radiation from a radiation source, wherein a first one of the radiation detectors is positioned to at least partially occlude a second one of the radiation detectors to attenuate the radiation received by the second radiation detector;
a plurality of neutron detectors implemented as panels surrounding the first and second radiation detectors;
an inertial measurement unit configured to detect relative movement of the radiation detectors in relation to the radiation source; and
a processor configured to:
receive detection information provided by the first and second radiation detectors in response to the radiation,
identify the radiation source using the detection information,
receive location information provided by a navigation system,
receive relative location information provided by the inertial measurement unit, and
determine an absolute location of the radiation source using the location information, the relative location information, and the detection information.

19. The system of claim 18, wherein:
the radiation detectors are gamma radiation detectors configured to detect gamma radiation from the radiation source;

the detection information is gamma detection information provided in response to the gamma radiation;

the system further comprises a neutron moderator shell; and the plurality of neutron radiation detectors are configured to receive neutron radiation from the radiation source passed by the neutron moderator shell and provide neutron detection information in response to the neutron radiation.

20. A method of operating the system of claim 18, the method comprising operating the processor to:

receive the detection information provided by the first and second radiation detectors;

identify the radiation source using the detection information;

receive the location information provided by the navigation system;

receive the relative location information provided by the inertial measurement unit; and determine the absolute location of the radiation source using the location information, the relative location information, and the detection information.

\* \* \* \* \*